US010552291B2

(12) United States Patent
Glass et al.

(10) Patent No.: US 10,552,291 B2
(45) Date of Patent: *Feb. 4, 2020

(54) METHOD AND SYSTEM FOR MEASURING USER ENGAGEMENT WITH CONTENT ITEMS

(71) Applicant: Yahoo Holdings, Inc., Sunnyvale, CA (US)

(72) Inventors: Alyssa Glass, Sunnyvale, CA (US); Xing Yi, Milpitas, CA (US)

(73) Assignee: Oath Inc., New York, NY (US)

( * ) Notice: Subject to any disclaimer, the term of this patent is extended or adjusted under 35 U.S.C. 154(b) by 870 days.

This patent is subject to a terminal disclaimer.

(21) Appl. No.: 14/270,950

(22) Filed: May 6, 2014

(65) Prior Publication Data

US 2015/0324271 A1 Nov. 12, 2015

(51) Int. Cl.
*G06F 3/0482* (2013.01)
*G06F 16/907* (2019.01)
*G06F 16/9535* (2019.01)
*G06F 11/34* (2006.01)

(52) U.S. Cl.
CPC ........ *G06F 11/3438* (2013.01); *G06F 3/0482* (2013.01); *G06F 16/907* (2019.01); *G06F 16/9535* (2019.01)

(58) Field of Classification Search
CPC ......... G06F 17/30864; G06F 17/30867; G06F 17/30522; G06F 17/30528; G06F 17/3053; G06F 17/30544; G06F 17/30651; G06F 11/3438; G06F 16/907; G06F 16/9535; G06F 3/0482

USPC ................................ 715/700–866
See application file for complete search history.

(56) References Cited

U.S. PATENT DOCUMENTS

| 7,526,470 B1* | 4/2009 | Karnawat ......... G06F 17/30867 |
| 7,895,225 B1* | 2/2011 | Thirumalai ......... G06F 17/3071 |
| | | 707/748 |
| 8,893,012 B1* | 11/2014 | Zhang ................ G06Q 30/0245 |
| | | 705/14.41 |
| 8,903,852 B1* | 12/2014 | Pedregal ........... G06F 17/30864 |
| | | 707/707 |

(Continued)

OTHER PUBLICATIONS

Diane Kelly et al., Display Time as Implicit Feedback: Understanding Task Effects, SIGIR'04, Jul. 25-29, 2004, Sheffield, South Yorkshire, UK, 8 pages.

(Continued)

*Primary Examiner* — Daniel Samwel
(74) *Attorney, Agent, or Firm* — Pillsbury Winthrop Shaw Pittman LLP

(57) ABSTRACT

Method, system, and programs for measuring user engagement with content items. In one example, a query is received. A set of content items related to the query is obtained. A presentation of at least one content item of the set of content items is provided on a user interface. A user activity related to the at least one content item is determined. An amount of time between a time at which the presentation of the at least one content item is provided on the user interface and a time at which the user activity occurred is determined. A score associated with the content item is determined based on the amount of time. Information related to user engagement with the set of content items is generated based on the score.

17 Claims, 16 Drawing Sheets

(56) References Cited

U.S. PATENT DOCUMENTS

| | | | | |
|---|---|---|---|---|
| 8,990,193 | B1* | 3/2015 | Reynar | G06F 17/30867 |
| | | | | 707/726 |
| 9,063,972 | B1* | 6/2015 | Marra | G06F 3/0351 |
| 2007/0043721 | A1* | 2/2007 | Ghemawat | G06F 17/3053 |
| 2009/0055355 | A1* | 2/2009 | Brunner | G06F 17/30864 |
| 2009/0070318 | A1* | 3/2009 | Song | G06F 17/30864 |
| 2009/0193009 | A1* | 7/2009 | Naick | G06F 17/30867 |
| 2009/0282023 | A1* | 11/2009 | Bennett | G06F 17/30646 |
| 2010/0082566 | A1* | 4/2010 | Wang | G06F 17/30648 |
| | | | | 707/705 |
| 2011/0264673 | A1* | 10/2011 | White | G06F 17/30867 |
| | | | | 707/750 |
| 2011/0307411 | A1* | 12/2011 | Bolivar | G06Q 30/0282 |
| | | | | 705/347 |
| 2013/0104063 | A1* | 4/2013 | Legris | G06F 3/0484 |
| | | | | 715/765 |
| 2015/0169576 | A1* | 6/2015 | Panda | G06F 17/30648 |
| | | | | 707/723 |

OTHER PUBLICATIONS

Ryen W. White et al., A Study on the Effects of Personalization and Task Information on Implicit Feedback Performance, CIKM'06, Nov. 5-11, 2006, Arlington, Virginia, 10 pages.

Songhua Xu et al, A User-Oriented Webpage Ranking Algorithm Based on User Attention Time, Proceedings of the Twenty-Third AAAI Conference on Artificial Intelligence (2008), pp. 1255-1260.

Chao Liu et al., Understanding Web Browsing Behaviors through Weibull Analysis of Dwell Time, SIGIR'10, Jul. 19-23, 2010, Geneva, Switzerland, 8 pages.

Chao Liu et al., Using Dwell Time as an Implicit Measure of Usefulness in Different Task Types, SASIST 2011, Oct. 9-13, 2011, New Orleans, LA, 4 pages.

Songhua Xu et al, Mining User Dwell Time for Personalized Web Search Re-Ranking, Proceedings of the Twenty-Second International Joint Conference on Artificial Intelligence (2011), pp. 2367-2372.

Ahmed Hassan et al., Personalized Models of Search Satisfaction, CIKM'13, Oct. 27-Nov. 1, 2013, San Francisco, CA, 10 pages.

* cited by examiner

METHOD AND SYSTEM FOR MEASURING USER ENGAGEMENT WITH CONTENT ITEMS

CROSS-REFERENCE TO RELATED APPLICATION

The present application is related to U.S. patent application Ser. No. 14/270,917, filed on May 6, 2014, entitled METHOD AND SYSTEM FOR MEASURING USER ENGAGEMENT WITH CONTENT ITEMS, which is incorporated herein by reference in its entirety.

BACKGROUND

1. Technical Field

The present teaching relates to methods, systems and programming for measuring user engagement. Particularly, the present teaching is directed to methods, systems, and programming for measuring user engagement with content items.

2. Discussion of Technical Background

The Internet has made it possible for a user to electronically access virtually any content at any time and from any location. With the explosion of information, it has become increasingly important to provide users with information that is relevant to the user. Further, as users of today's society rely on the Internet as their source of information, entertainment, and/or social connections, e.g., news, social interaction, movies, music, etc., it is critical to provide users with information they find valuable.

Efforts have been made to attempt to enable users to readily access relevant content. As an example, there are systems that identify users' interests based on observations made on users' interactions with content. In the context of search, for instance, observations regarding user engagement with search results are typically facilitated via click-thru measurements. In particular, a system determines that a content item has been accessed by a user when the user "clicks" a search result link to access the content item as a result of the selected link containing a URL that identifies the accessed content item. As such, by monitoring which search result links are clicked by users, the system can determine which content items are accessed by users and, thus, determine which content items (or their associated search result links) are more interesting to the users overall and/or on a query basis. Such determinations may then be used to personalize the content or the search results links that are provided to users during subsequent queries or other user activities.

However, in the context of mobile, a list of search result links may not be as practical. When approaches other than the traditional list of search result links are utilized to enable users to access content items related to a query, analysis of user engagement based on click-thru measurements may not be an appropriate option. Thus, there is a need for measuring user engagement with content items without, for example, necessarily relying solely on traditional click-thru measurements.

SUMMARY

The teachings disclosed herein relate to methods, systems, and programming for measuring user engagement. More particularly, the present teaching relates to methods, systems, and programming for measuring user engagement with content items.

In one example, a method, implemented on at least one machine each of which has at least one processor, storage, and a communication platform connected to a network for measuring user engagement, is disclosed. A query is received. A set of content items related to the query is obtained. A presentation of at least one content item of the set of content items is provided on a user interface. A user activity related to the at least one content item is determined. An amount of time between a time at which the presentation of the at least one content item is provided on the user interface and a time at which the user activity occurred is determined. A score associated with the content item is determined based on the amount of time. Information related to user engagement with the set of content items is generated based on the score.

In a different example, another method, implemented on at least one machine each of which has at least one processor, storage, and a communication platform connected to a network for measuring user engagement, is disclosed. A query is received. A set of content items related to the query is obtained. A presentation of at least one content item of the set of content items is provided on a user interface. A user activity related to the at least one content item is determined. An amount of time between a time at which a previous user activity occurred and a time at which the user activity occurred is determined. A score associated with the content item is determined based on the amount of time. Information related to user engagement with the set of content items is generated based on the score.

In another example, a system for measuring user engagement is disclosed. The system includes a search engine system and an engagement assessment system. The engagement assessment system includes a user activity analysis unit, a user engagement evaluation unit, and a user engagement report generation unit. The search engine system is configured to receive a query, to obtain a set of content items related to the query, and to provide, on a user interface, a presentation of at least one content item of the set of content items. The user activity analysis unit is configured to determine a user activity (e.g., related to manipulation of the content item). The user engagement evaluation unit is configured to determine an amount of time between a time at which the presentation of the at least one content item is provided on the user interface and a time at which the user activity occurred, and to determine a score associated with the content item based on the amount of time. The user engagement report generation unit is configured to generate information related to user engagement with the set of content items based on the score.

In different example, another system for measuring user engagement is disclosed. The system includes a search engine system and an engagement assessment system. The engagement assessment system includes a user activity analysis unit, a user engagement evaluation unit, and a user engagement report generation unit. The search engine system is configured to receive a query, to obtain a set of content items related to the query, and to provide, on a user interface, a presentation of at least one content item of the set of content items. The user activity analysis unit is configured to determine a user activity (e.g., related to manipulation of the content item). The user engagement evaluation unit is configured to determine an amount of time between a time at which a previous user activity occurred and a time at which the user activity occurred is determined. A score associated with the content item, and to determine a score associated with the content item based on the amount of time. The user engagement report generation unit is configured to generate information related to user engagement with the set of content items based on the score.

Other concepts relate to software for measuring user engagement. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium has information recorded thereon for measuring user engagement, wherein the information, when read by the machine, causes the machine to perform a series of steps. A query is received. A set of content items related to the query is obtained. A presentation of at least one content item of the set of content items is provided on a user interface. A user activity related to the at least one content item is determined. An amount of time between a time at which the presentation of the at least one content item is provided on the user interface and a time at which the user activity occurred is determined. A score associated with the content item is determined based on the amount of time. Information related to user engagement with the set of content items is generated based on the score.

In a different example, a machine readable and non-transitory medium has information recorded thereon for measuring user engagement, wherein the information, when read by the machine, causes the machine to perform a different series of steps. A query is received. A set of content items related to the query is obtained. A presentation of at least one content item of the set of content items is provided on a user interface. A user activity related to the at least one content item is determined. An amount of time between a time at which a previous user activity occurred and a time at which the user activity occurred is determined. A score associated with the content item is determined based on the amount of time. Information related to user engagement with the set of content items is generated based on the score.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
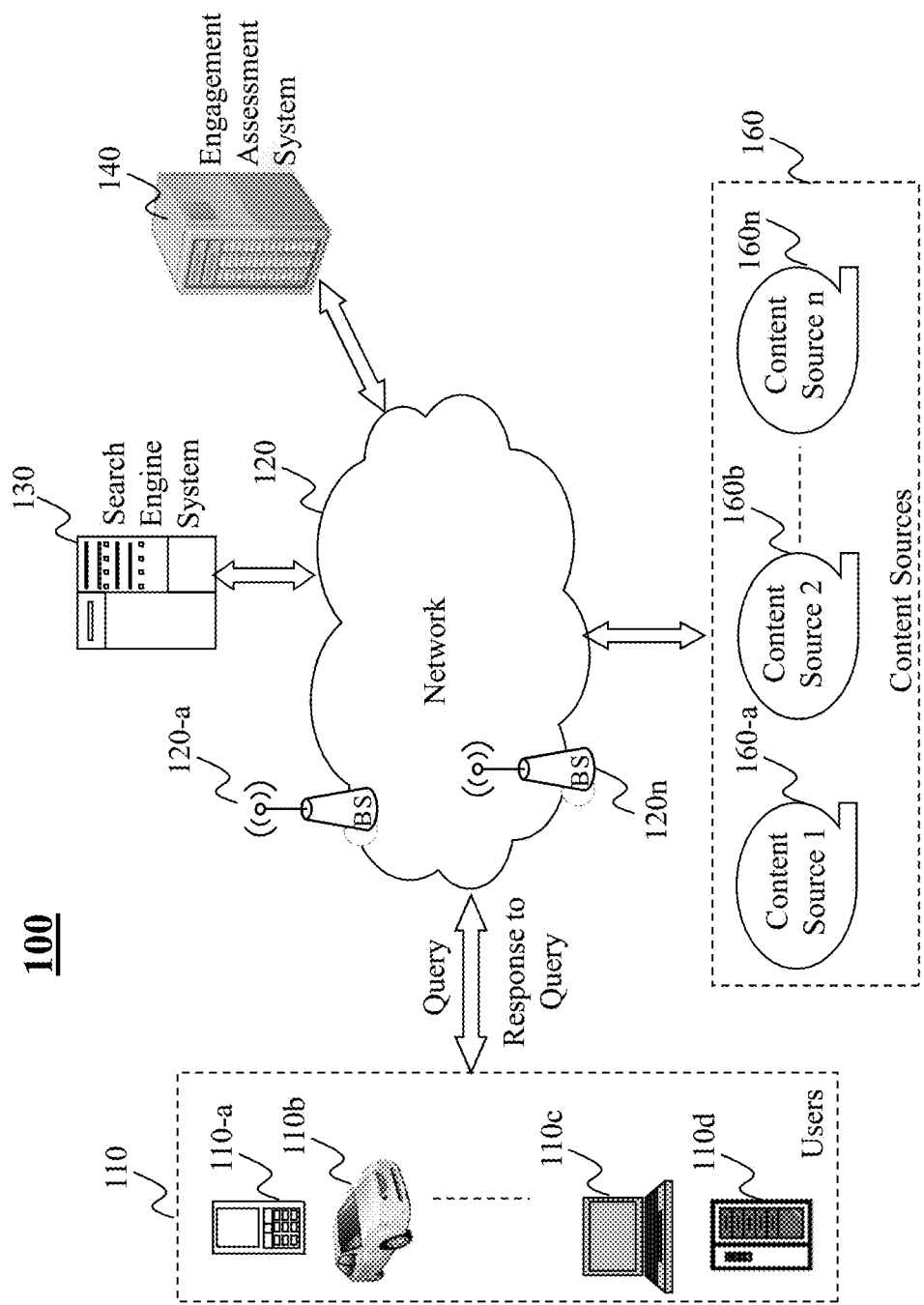
FIGS. 1-2 depict exemplary embodiments of a networked environment in which user engagement measurement is applied, according to different embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to measuring user engagement with content items. In various embodiments, a presentation of a content item is provided on a user interface to a user in response to receipt of a query from the user. The presentation of the content item is provided, for example, without providing an intermediate set of results related to the query after the receipt of the query and before the presentation of the content item is provided to the user. In some embodiments, the content item is an information card. Other content items can, for example, be presented as information in respective portions of the information card. In other embodiments, the content item comprises at least one of a webpage, a video, an image, an audio, a document, or other content item. User activities related to the content item is monitored, and user engagement information is generated based on the monitored user activities (e.g., a report comprising information about content items and their associated user engagement scores).

In an embodiment, the user activities comprises a user activity related to manipulation of the content item, a user activity related to manipulation of the presentation of the content item, a user activity related to manipulation of metadata associated with the content item, or other manipulated-related user activity. One or more scores associated with the content item are determined based on the manipulation activities. Information related to user engagement with the content item is then determined based on the scores. As an example, manipulation of the content item may comprise modification of an instance of the content item and storage of the modified instance such that a subsequent presentation of the content item to the user will comprise a presentation of the modified instance of the content item. As another example, manipulation of the presentation of the content item may comprise modification of the presentation of the content item such that a subsequent presentation of the content item to the user will comprise a presentation of the non-modified instance of the content item. As yet another example, manipulation of the presentation of the content item may comprise manipulating which portions of the content item are currently in view (e.g., scrolling so that certain portions of the content item are in view while other portions are not in view). As a further example, manipulation of metadata associated with the content item may comprise modification of the metadata associated with the content item. In one use case, when a user "likes" or "dislikes" a content item that is presented responsive to a query, the "like" or "dislike" may be stored as metadata associated with the content item, thereby modifying the metadata associated with the content item.

In another embodiment, amounts of time between a time at which the presentation of the content item is provided to the user and times at which various user activities related to the content item occur are determined. In yet another embodiment, amounts of time between the times at which various user activities related to the content item occur are determined. One or more scores associated with the content item are determined based on the amounts of time. Information related to user engagement with the content item is then determined based on the scores.

In a further embodiment, various user activities that occur during a presentation of one or more content items of a set of content items related to the query is determined. One or more scores associated with the set of content items are determined based on the various user activities. In some embodiments, the scores are determined based on an amount of time between times at which various ones of the user activities occurred. Information related to user engagement with the set of content items is then determined based on the scores.

As discussed, in the context of mobile or other similar environments, a list of search result links may not be as practical. When approaches other than the traditional list of search result links are utilized to enable users to access content items related to a query, analysis of user engagement based solely on click-thru measurements may not be an appropriate option. For example, search results can be presented as "cards" that are loaded with content relevant to a user query, reducing the need for a user to click/tap on a link to access an external or third party site that comprise the same content. As such, it is important not to rely solely on click-thru activities in such scenarios, and to measure user engagement based on other user activities, such as scrolling vertically through information, swiping horizontally through a carousel of information, pinches, zooms, rotations, dismissals, collapses, external application selection actions related to the information cards, etc.

FIG. 1 is a high level depiction of an exemplary system 100 in which an engagement assessment system 140 is deployed to measure user engagement with content items, according to an embodiment of the present teaching. The exemplary system 100 includes users 110, a network 120, a search engine system 130, content sources 160, an engagement assessment system 140, content sources 160, or other components. The network 120 in system 100 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 120a-120n, through which a data source may connect to the network in order to transmit information via the network.

Users 110 may be of different types such as users connected to the network via desktop connections (110-d), users connecting to the network via wireless connections such as through a laptop (110-c), a handheld device (110a), or a built-in device in a motor vehicle (110b). A user may submit a query to the search engine system 130 via the network 120 and receive a query result from the search engine system 130 through the network 120. In some embodiments, the user may be provided with a presentation of content items without first being provided with an intermediate set of results related to the query after the submission of the query and before the presentation of the content items. For example, the presentation of the content items may be provided to the user without first presenting the user with a list of search result links and requiring the user to select (e.g., by clicking, tapping, etc.) one of the presented search result links to be provided with a presentation of one of the content items.

In some embodiments, a browser (or other application) at a user device monitors activities at the user device, such as when a presentation of a content item is loaded on the browser, when certain user activities (e.g., actions, inactions, etc.) related to the content item occurs, etc. Responsive to the monitoring, the browser (or other application) generates information regarding the user activities, information regarding the timing of the presentation or the user activities, or other information. Subsequently, the generated information is transmitted to one or more servers (e.g., a server comprising the search engine system 130, the engagement assessment system 140, or both). The engagement assessment system 140 can then determine the user activities that occurred at the user device, the amounts of time between the time at which the presentation of the content item is provided to the user and the times at which certain user activities occurred, the amounts of time between the times at which various user activities occurred, or other information.

The content sources 160 include multiple content sources 160a, 160b, . . . 160n. A content source may correspond to a web page host corresponding to an entity, whether an individual, a business, or an organization such as USPTO.gov, a content provider such as cnn.com and Yahoo.com, or a content feed source such as Twitter or blogs. Both the search engine system 130 and the engagement assessment system 140 may access information from any of the content sources 160a, 160b, . . . , 160n and rely on such information to respond to a query (e.g., the search engine system 130 identifies content related to keywords in the query and returns the result to a user).

Figure 2:
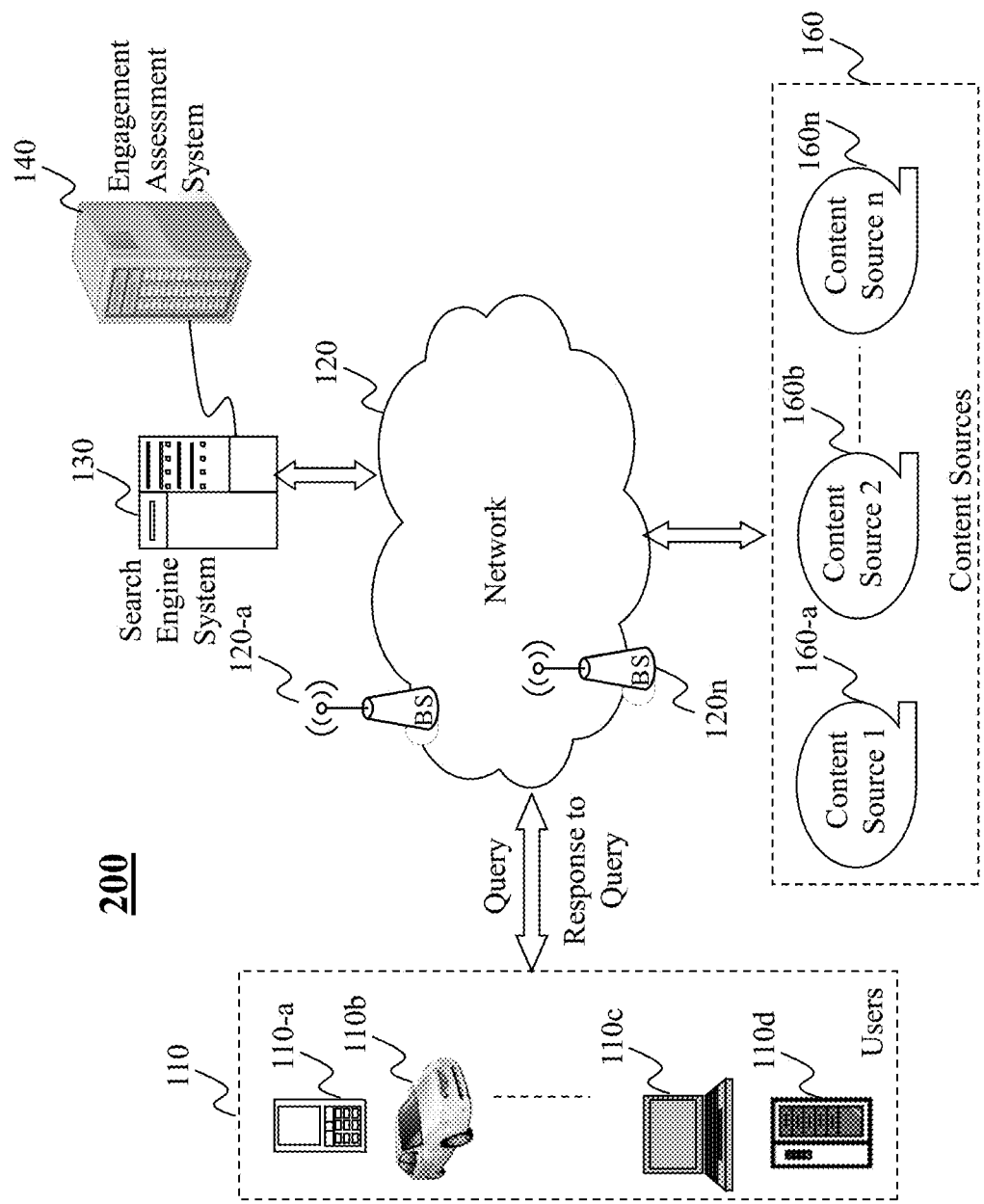

FIG. 2 is a high level depiction of an exemplary system 200 in which the engagement assessment system 140 is deployed to measure user engagement with content items, according to an embodiment of the present teaching. The exemplary networked environment 200 in this embodiment is similar to the exemplary networked environment 100 in FIG. 1, except that the engagement assessment system 140 in this embodiment connects to the network 120 via the search engine system 130. For example, the engagement assessment system 140 may serve as a backend system of the search engine system 130.

Figure 3:
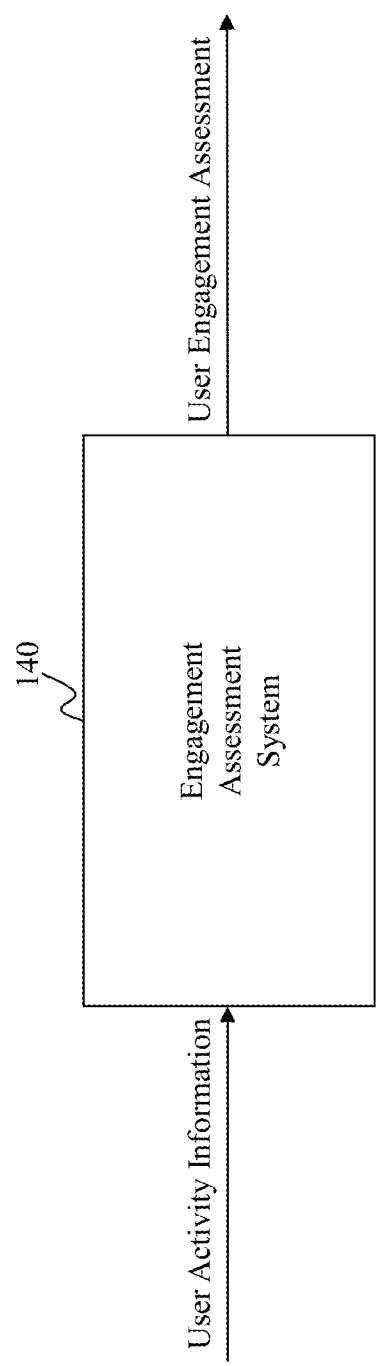
FIG. 3 is a high level exemplary system diagram of an engagement assessment system, according to an embodiment of the present teaching.

FIG. 3 depicts the inputs and output of the engagement assessment system 140, according to an embodiment of the present teaching. As shown, the engagement assessment system 140 receives user activity information from a user device as input. The user activity information is, for example, received in real-time as the user activities are occurring, on a periodic basis, based on a schedule, etc. The user activity information comprises information regarding the content items with which users interacted, information regarding the types of user activities that occurred, information that can be used to identify users (e.g., without personally identifiable information) with which the user activities are associated, information regarding the times at which the user activities occurred, information regarding the times at which the presentations of the content items are provided to the users, or other information. By analyzing the user activity information, the engagement assessment system 140 can generate user engagement information that can be utilized to personalize content items for users (e.g., that are provided in response to subsequent queries), organize the content items for users, provide recommendations to users, or provide other benefits.

Figure 4:
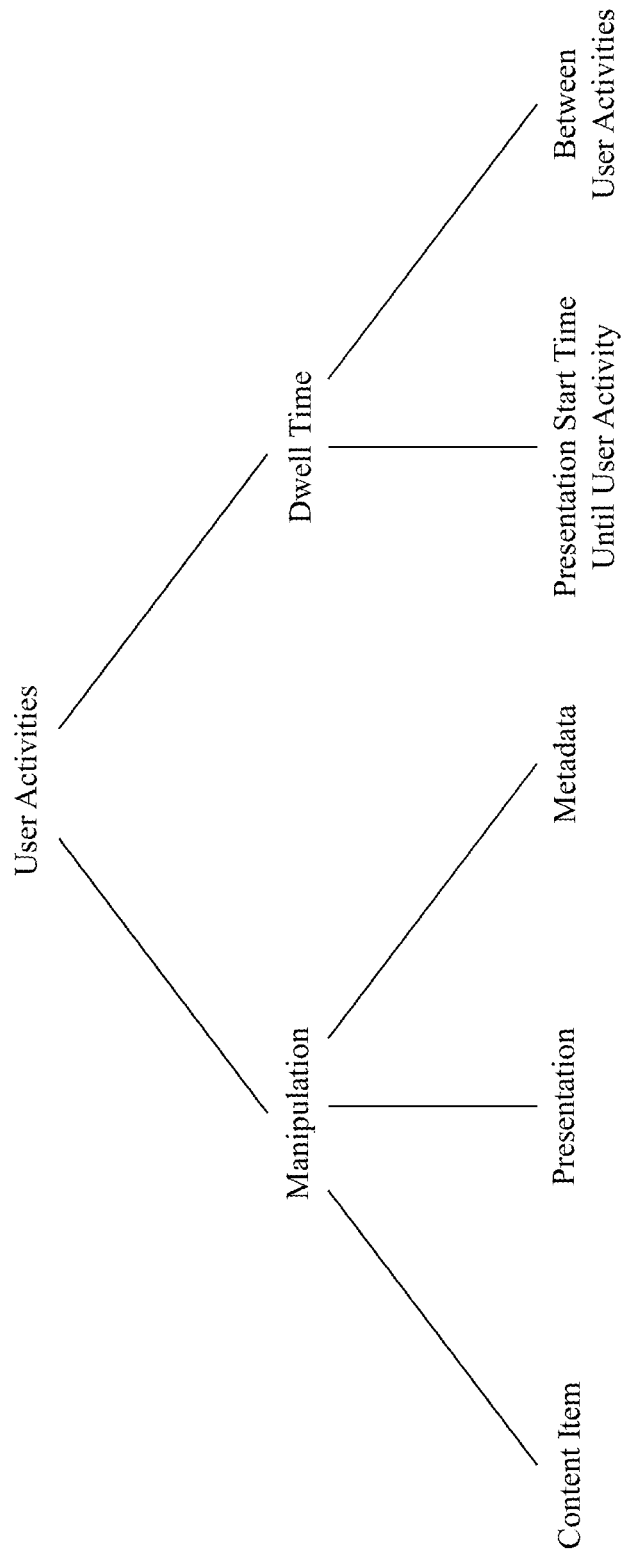
FIG. 4 is a high level exemplary diagram of different user activities, according to an embodiment of the present teaching.
Figure 5:
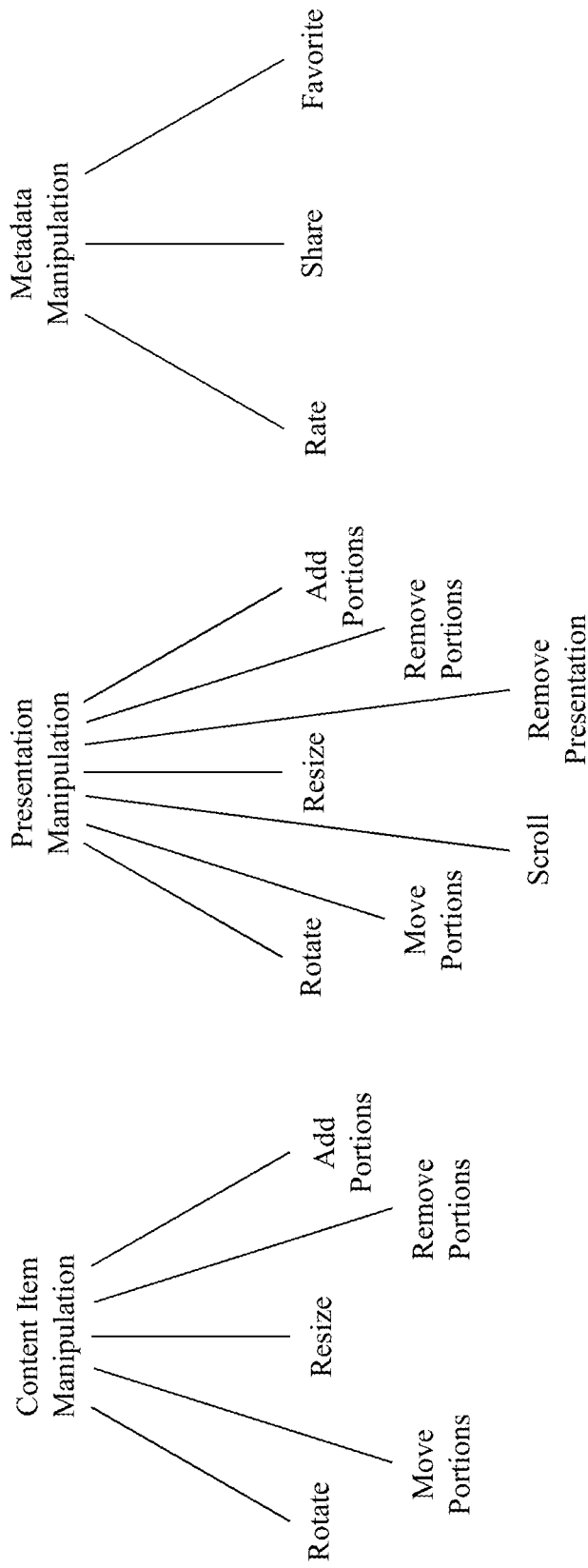
FIG. 5 is a high level exemplary diagram of different manipulation activities, according to an embodiment of the present teaching.

FIG. 4 is a high level exemplary diagram of different user activities, according to an embodiment of the present teaching. As illustrated in FIG. 4, users activities may comprise user activities related to manipulation, user activities related to dwell time, or other user activities. In an embodiment, manipulation activities comprises user activities related to manipulation of a content item, user activities related to manipulation of a presentation of the content item, user activities related to manipulation of metadata associated with the content item, or other manipulation activities. As an example, manipulation of the content item may comprise modification of an instance of the content item and storage of the modified instance such that a subsequent presentation of the content item to the user will comprise a presentation of the modified instance of the content item. As shown in FIG. 5, for instance, manipulation of the content item includes rotations of the content item (or portions thereof), resizing of the content item (or portions thereof), adding portions to the content item, moving portions within the content item, removing portions from the content item, or other modification.

As another example, manipulation of the presentation of the content item may comprise modification of the presentation of the content item (e.g., such that a subsequent presentation of the content item to the user will comprise a presentation of the non-modified instance of the content item), control of which portions of the content item are currently in view (e.g., scrolling so that certain portions of the content item are in view while other portions are not in view), removal of the presentation of the content item, or other manipulation. As shown in FIG. 5, manipulation of the presentation of the content item includes rotations of the presentation (or portions thereof), resizing of the presentation (or portions thereof) adding portions to the presentation, moving portions within the presentation, removing portions from the presentation, scrolling through portions of the content item, removing the presentation, or other manipulation.

As yet another example, manipulation of metadata associated with the content item may comprise modification of the metadata associated with the content item. As depicted in FIG. 5, manipulation of the metadata associated with the content item includes modifications of metadata indicating ratings (e.g., "likes," "dislikes," numerical ratings, etc.), metadata indicating share (e.g., to/by whom the content item has been shared, number of shares, etc.), metadata indicating favorites (e.g., by whom the content item has been favorite, number of users that favorite the content item, etc.), or other metadata. In one use case, when a user "likes" or "dislikes" a content item that is presented responsive to a query, the "like" or "dislike" may be stored as metadata associated with the content item, thereby modifying the metadata associated with the content item.

Figure 6:
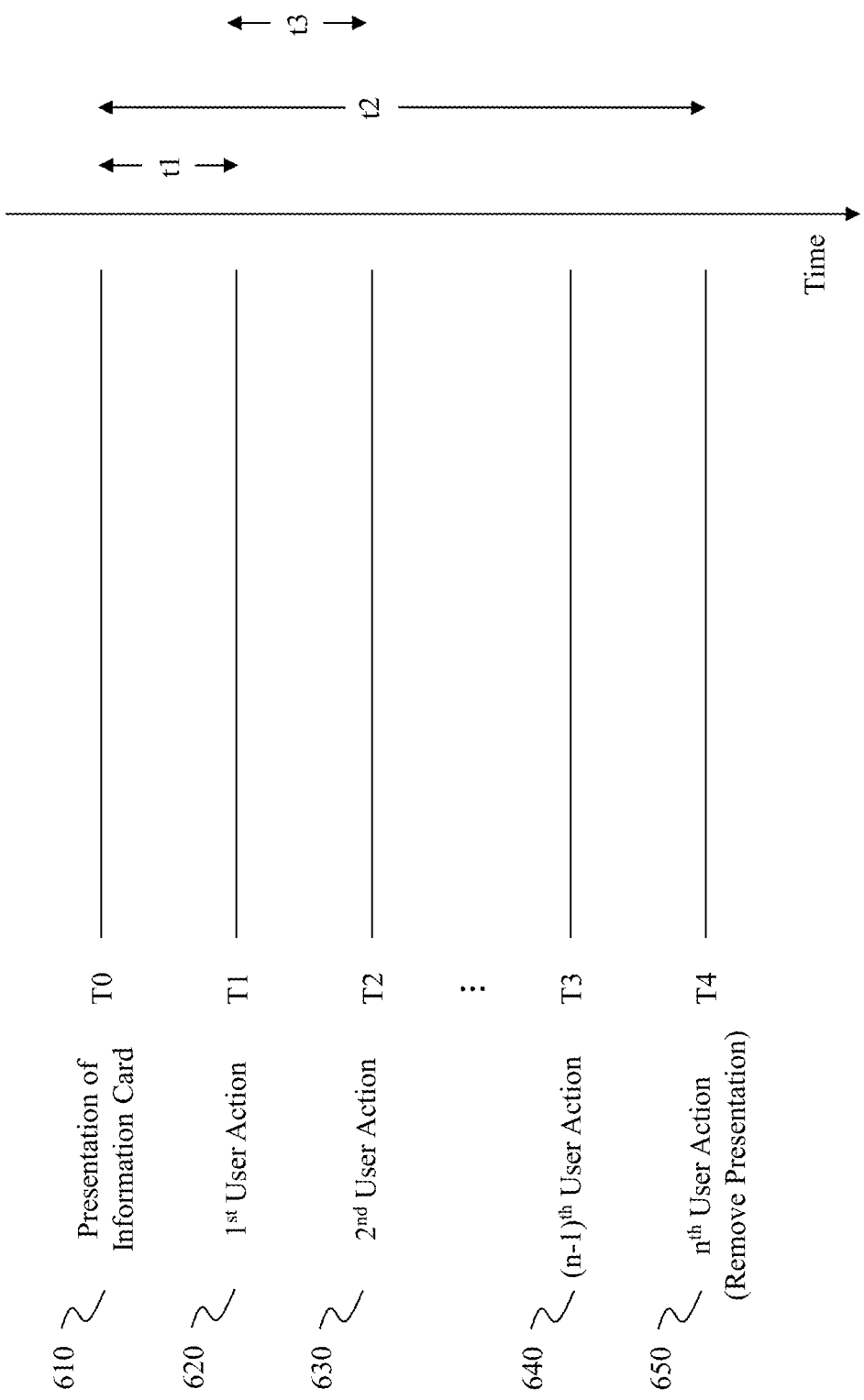
FIG. 6 is a high level exemplary diagram of measuring time between events, according to an embodiment of the present teaching.

Referring back to FIG. 4, user activities related to dwell time may comprise user activities that last for a period of time, such as remaining in a particular state for a period of time. As shown in FIG. 6, after a presentation of an information card is provided to a user at time T0 (610), the user did not interact with the information card until time T1 (620) at which the user performed a first user action with respect to the information card. As such, the user's remained inactive with respect to interaction with the information card for a time period t1. The time period t1 may then be utilized to determine the level of interest of the user with the presentation of the information card. As an example, if the time period t1 is short, then the user is more likely to have been interested in the information card because the user quickly interacted with the information card. On the other hand, if the time period t1 is long, then the user is less likely to have been interested in the information card. Of course, other factors, such as the nature of content presented on the information card or the nature of the first user action, may be considered to obtain a better estimate of the level of interest of the user with the information card (e.g., an information card with a considerable amount of text may result in the user reading the text currently in view before scrolling to other portions of the information card).

In addition, as depicted in FIG. 6, the user has been recorded to have spent a time period t2 with the presentation of the information card (e.g., from time T0 until time T4 during which events 610, 620, 630, 640, and 650 occur). As with the time period t1, the time period t2 may be utilized to determine the level of interest of the user with the information card. For example, if the time period t2 is short, then the user is less likely to have been interested in the information card because the user removed the presentation of the information card (e.g., removal from view, discarding of the information card, etc.) in a short period of time. On the other hand, if the time period t2 is long, then the user is more likely to have been interested in the information card. Again, other factors may be considered to obtain a better estimate of the level of interest of the user with the information card (e.g., the information card may only comprise a small amount of content).

Moreover, as illustrated in FIG. 6, the amount of time between user activities (e.g., between user actions, between a user action and user inaction, etc.) may be considered to determine the level of interest of the user with the information card. Although FIG. 6 depicts a time period t3 to describe the amount of time between two user actions with respect to the information card, time periods between a user action and a user inaction may also be considered to determine the level of interest of users with content items (e.g., the information card).

In one use case, for example, a scroll action is performed during a presentation of an information card. If an amount of time between the start time of the scroll action and the end time of the scroll action (e.g., amount of time between related action and inaction) is a short period of time, but the length of the portions of the information card that user scrolled through is long (e.g., very fast scroll), it may be deemed unlikely that the user actually read the information on the scrolled-through portions of the information card. As such, it is less likely that the user was interested in the portions of the information card that the user scrolled through.

In another use case, a second scroll action is performed during the presentation of the information card. If an amount of time between the start time of the second scroll action and the end time of the second scroll action is long, but the length of the portions of the information card that the user scrolled through is short (e.g., very slow scroll), it may be deemed likely that the user carefully read the scrolled-through portions of the information card. Thus, it is more likely that the user was interested in the portions of the information card that the user scrolled through.

Figure 7:
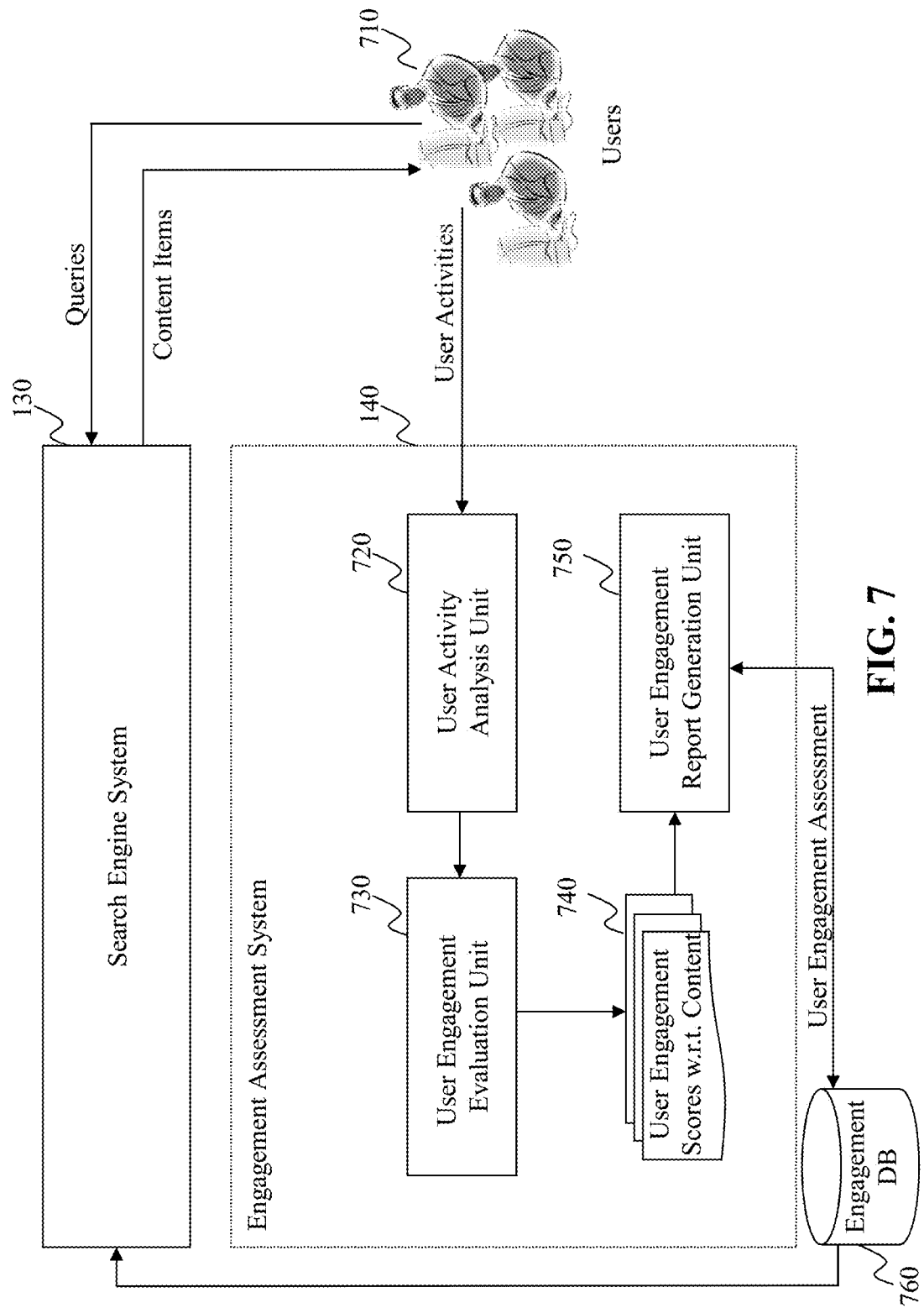
FIG. 7 is a high level exemplary system diagram of a search engine system and an engagement assessment system, according to an embodiment of the present teaching.

FIG. 7 depicts a high level exemplary system diagram of the search engine system 130 and the engagement assessment system 140, according to an embodiment of the present teaching. As shown, users 710 submit queries to the search engine system 130, and the search engine system 130 provides the users 710 with presentations of content items related to the submitted queries. Information regarding user activities occurring at user devices of the users 710 is received at the engagement assessment system 140, which then processes the user activity information to generate user engagement information.

As depicted in FIG. 7, the engagement assessment system 140 comprises a user activity analysis unit 720, a user engagement evaluation unit 730, and a user engagement report generation unit 750. As an example, when the user activity information is received at the engagement assessment system 140, the user activity analysis unit 720 processes the user activity information to determine the content items with which the users interacted, what user activities occurred at the user devices of the users 710 with respect to the content items, which users interacted with which content items, the times at which the user activities occurred, the times at which the presentations of the content items are provided to the users, etc.

In addition, in some embodiments, the user activity analysis unit 720 determines, based on the user activity information, the nature of the user activities, such as the type of each user activity, the amount of time between pairs of user activities, or the amount of time between a user activity and another event (e.g., start or end of a presentation of a content item, start or end of a presentation of a set of content item, etc.). Such determinations are then provided to the user engagement evaluation unit 730 to determine scores 740 associated with the user activity and/or the content items.

As discussed, in one use case, if an amount of time between the start time of a scroll action on an information card and the end time of the scroll action (e.g., amount of time between related action and inaction) is a short time period, but the length of the portions of the information card that user scrolled through is long (e.g., very fast scroll), it may be deemed unlikely that the user actually read the information on the scrolled-through portions of the information card. Thus, the user engagement evaluation unit 730 may associate a low score with the portions of the content item that the user scrolled through.

In another use case, if an amount of time between the start time of a scroll action on an information card and the end time of the scroll action is long, but the length of the portions of the information card that the user scrolled through is short (e.g., very slow scroll), it may be deemed likely that the user carefully read the scrolled-through portions of the information card. Therefore, the user engagement evaluation unit 730 may associate a high score with the portions of the content item that the user scrolled through.

In a further user case, the low score associated with the first scrolled-through portions and the high score associated with the second scrolled-through portions may be processed (along with other scores associated with the information card) to determine a combined score associated with the information card. It is understood that, although exemplary scoring metrics are described herein, they are by ways of example rather than limitation. Any other appropriate scoring metrics can be utilized to determine scores associated with content items within the scope of the present teaching. For example, other scoring metrics may comprise the amount of time that a user dwells on a card or set of cards, a number of cards browsed during presentation of a set of cards, the rate of certain user activities (or types of user activities) that occur during presentation of a card or a set of cards, the number of cards removed during a presentation of a set of cards (e.g., "discarding" cards), the number of cards saved by the user during presentation of a set of cards (e.g., bookmarked for later viewing), the ratings given to a set of cards by the user (e.g., likes, dislikes, numerical rating, etc.), the number of cards that are shared by the user with other users during presentation of a set of cards, etc.

Figure 8:
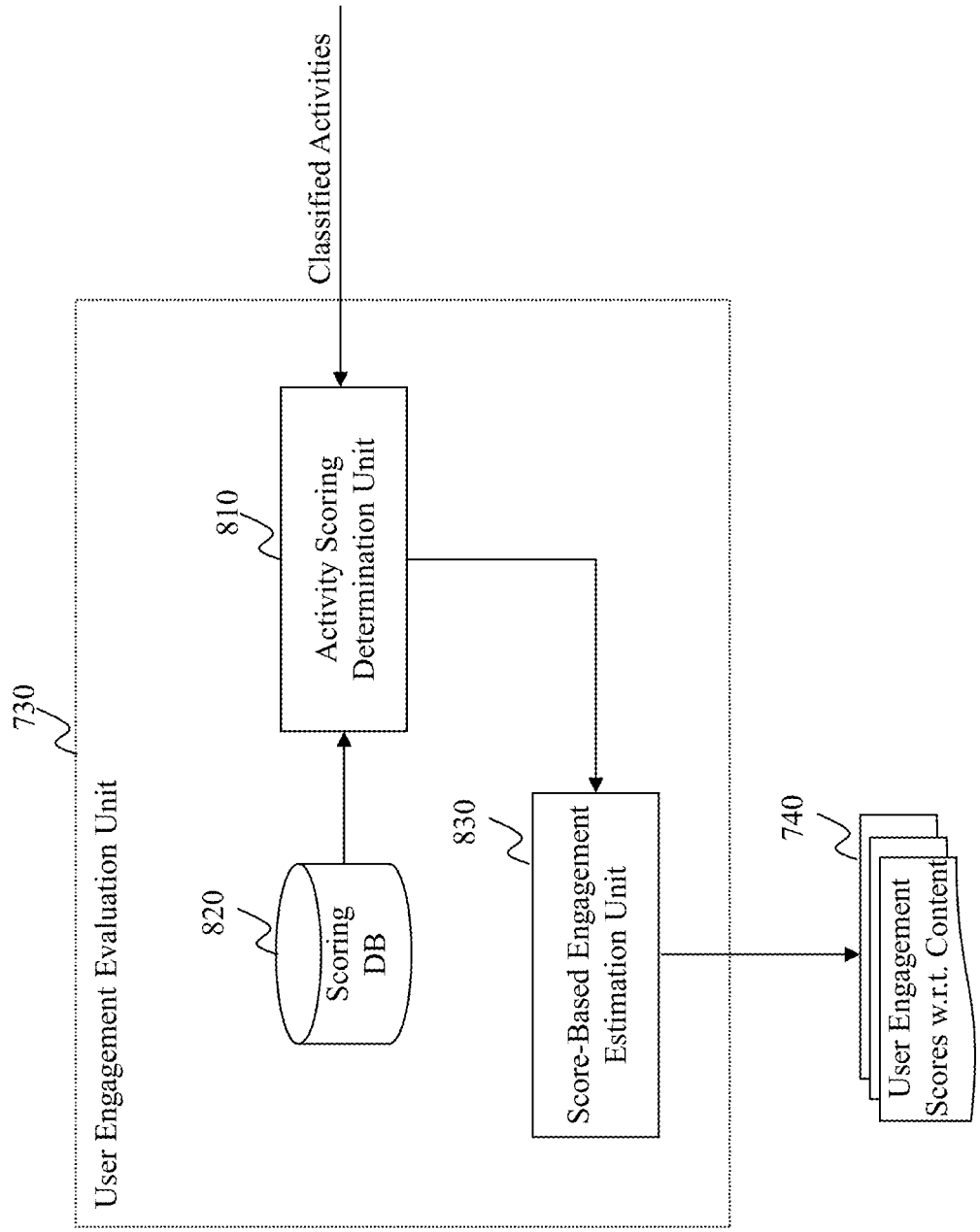
FIG. 8 is a high level exemplary system diagram of a user engagement evaluation unit, according to an embodiment of the present teaching.

As illustrated in FIG. 8, in an embodiment, the user engagement evaluation unit 730 comprises an activity scoring determination unit, a scoring database 820, and a score-based engagement estimation unit 830. As discussed, in some embodiments, the user activity analysis unit 720 determines the nature of user activities, such as the type of each user activity, the amount of time between pairs of user activities, or the amount of time between a user activity and another event (e.g., start or end of a presentation of a content item, start or end of a presentation of a set of content item, etc.). The user activity analysis unit 720 then categorizes/classifies the user activities and provides information regarding the categorized/classified user activities to the user engagement evaluation unit 730.

As shown, the activity scoring determination unit 810 processes the classified activity information to obtain scoring information from the scoring database 820. In some embodiments, the scoring database 820 comprises information regarding scores to be assigned to the user activities based on the user activity types, the amount of time between pairs of user activities, or the amount of time between a user activity and another event. The scoring database 820 may further comprise information regarding weights to be assigned to scores based on information surround the scores such as the user activity types, the amount of time between pairs of user activities, or the amount of time between a user activity and another event. The scoring determination unit 810 obtains the scores and associated weights from the scoring database 820 based on the classified activity information. The scoring determination unit 810 then provides the scores and associated weights to the score-based engagement estimation unit 830.

The score-based engagement estimation unit 830 utilizes the scores and the weights to estimate user engagement with a content item or a set of content items related to a query. As depicted in FIG. 8, the score-based engagement estimation unit 830 estimates the user engagement in the form of user engagement scores 740. For example, the score-based engagement estimation unit 830 computes one or more user engagement scores for a content item based on scores and weights associated with user activities related to the content item.

In some embodiments, referring back to FIG. 7, the user engagement scores 740 is provided to user engagement report generation unit 750. The user engagement report generation unit 750 utilizes the user engagement scores 740 to generates information related to user engagement with a content item or a set of content items in the form of a user engagement assessment. In an embodiment, the user engagement report generation unit 750 obtains user engagement information from the engagement database 760, and utilizes the user engagement information from the engagement database 760 and the user engagement scores 740 to update the user engagement information. The updated user engagement information may then be utilized by the search engine system 130 to select content items to provide to users in response to subsequent queries.

As am example, if the user engagement scores 740 are associated with a particular content item, the user engagement report generation unit 750 may obtain prior user engagement information associated with the content item or a similar content item. The user engagement report generation unit 750 then processes the prior user engagement information and the user engagement scores 740 to generate updated/supplemental user engagement information for the content item or content items that are similar to the content item. The updated/supplemental user engagement information may subsequently be utilized by the search engine system 130 to determine whether and/or how to present the content item or similar content items (e.g., if the content items are relevant to a terms of a query, the search engine system 130 determines whether and/or how to present the content items based on the user engagement information).

Figure 9:
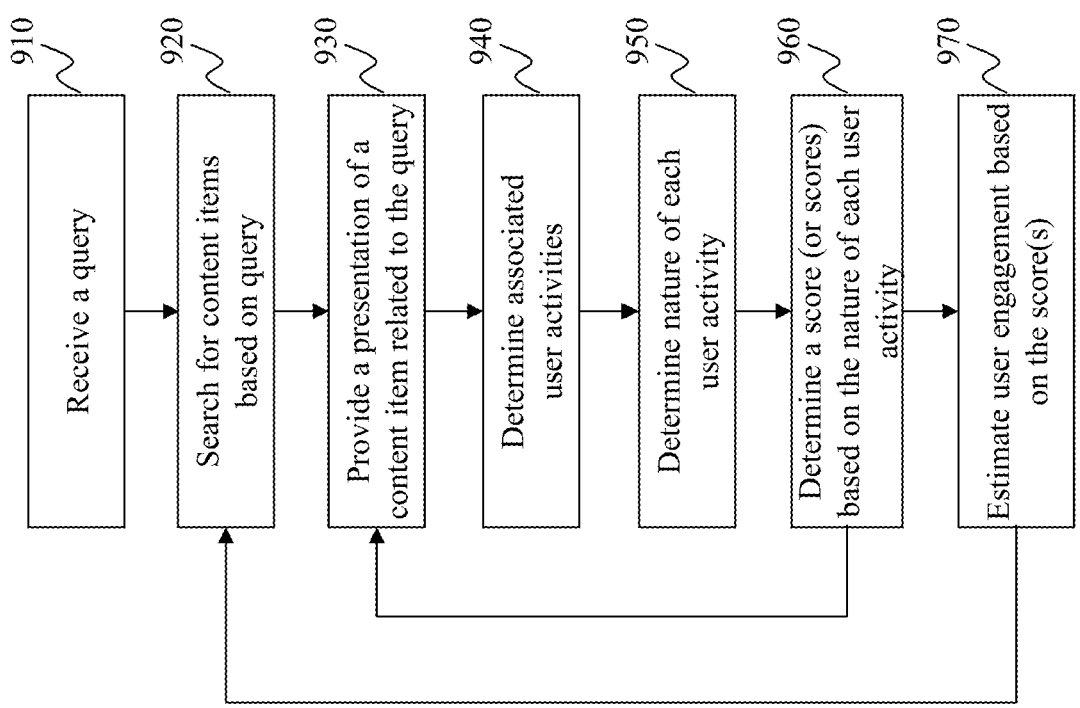
FIG. 9 is a flowchart of an exemplary process of measuring user engagement with content items, according to an embodiment of the present teaching.

FIG. 9 is a flowchart of an exemplary process of measuring user engagement with content items, according to an embodiment of the present teaching. As shown, a query is received at 910. In response to the received query, a search for content items may be performed based on the query at 920. As such, in response to the search, one or more content items related to the query are obtained. A presentation of at least one of the obtained content items is provided on a user interface at 930. As indicated, in some embodiments, the presentation of the content item may be provided to a user without providing an intermediate set of results related to the query after the receipt of the query and before the presentation of the content item. For example, the presentation of the content item may be provided to the user without first presenting the user with a list of search result links and requiring the user to select (e.g., by clicking, tapping, etc.) one of the presented search result links to be provided with the presentation of the content item.

At 940, user activities are determined. As discussed, and shown in FIG. 4, users activities may comprise user activities related to manipulation, user activities related to dwell time, or other user activities. In one use case, one or more of the determined user activities comprises one or more manipulation activities. In some embodiments, a manipulation activity (or other user activity) is initially detected at a user device. The user device then transmits information indicating the detection of the user activity to one or more servers (e.g., a server comprising the search engine system 130, the engagement assessment system 140, or both). The engagement assessment system 140, for instance, determines that the user activity occurred based on the information from the user device that indicates the detection of the user activity.

As an example, a user performs a user action configured to modify at least a portion of the content item (e.g., rotate command, move command, crop command, delete command, etc.). In response, an application at the user device (e.g., browser or other application) performs the modification indicated by the user action on a local instance of the content item, and then transmits the modified instance to one or more servers comprising the search engine system 130 and the engagement assessment system 140 along with information indicating the detected user action. Upon receipt of the modified instance, the search engine system 130 stores the modified instance such that a subsequent presentation of the content item to the user will comprise a presentation of the modified instance of the content item. The engagement assessment system 140 will also determine that the user action occurred at the user device with respect to the content item based on the information from the user device indicating the detected user action.

As another example, when a user performs a user action configured to modify at least a portion of the content item, the user device transmits information indicating the detected user action to one or more servers to cause an instance of the content item at one of the servers to be modified based on the detected user action. Upon receipt of the information indicating the detected user action, the search engine system 130 modifies the instance of the content item and stores the modified instance such that a subsequent presentation of the content item to the user will comprise a presentation of the modified instance of the content item. The information indicating the detected user action may also be utilized by the engagement assessment system 140 to determine that the user action occurred at the user device with respect to the content item.

At 950, the nature of each of the user activities is determined. As an example, the engagement assessment system 140 determines the type of each user activity, the amount of time between pairs of user activities, or the amount of time between a user activity and another event (e.g., start or end of a presentation of a content item, start or end of a presentation of a set of content item, etc.). In one use case, for instance, the engagement assessment system 140 obtains (e.g., from a user device) user activity information that indicates user activities that occurred at the user device, and processes the user activity information to determine the nature of each of the user activities.

At 960, a score associated with each user activity and/or with the content item is determined based on the nature of each user activity. In one use case, user activities that generally require more thought from the user (e.g., modifying a content item or presentation thereof) may result in higher scores for the content item than user activities that require less thought from the user (e.g., scrolling, removing from view, etc.). In another use case, user activities that correspond to explicit indications of interest (e.g., rating a content item, sharing a content item, etc.) may result in scores that directly correlate with the explicit indications. For example, if a user rates the content item a "5" on a scale of 1-5, and a score for the content item may be "10" on a scale of 1-10 before other factors are considered. In yet another use case, a score for the content item may be based on the amount of time between the occurrence of a user activity and the occurrence of some other event.

As an example, in one scenario, the content item is an information card related to a user query (e.g., cards 1040*a*-1040*n*) on which content related to the information card is presented, and the user activity is a user activity that removes the information card from view of the user (e.g., a swipe action that removes the information card from a set of information cards that is presented to the user, a drag and drop action that places the information card at the bottom of the set of information cards, etc.). A score is determined for the content item based on how long a user spends with the information card before removing the information card from view and/or other factors (e.g., an amount of manipulated activities that the user performs on the information card). If the user spends a long amount of time with the information card before removing the information card from view, a higher score may be assigned to the information card. On the other hand, if the user spends a short amount of time with the information card before removing the information card from review, a lower score may be assigned to the information card.

In another scenario, a score is determined for one or more portions of the information card (e.g., content items presented within the information card) based on how long a user spends with the portions of the information card before scrolling to other portions of the information card. If the user spends a long amount of time with certain portions of the information card before scrolling to other portions of the information card, a higher score may be assigned to the portions of the information card. On the other hand, if the user spends a short amount of time with the portions of the information card, a lower score may be assigned to the portions of the information card. In some embodiments, the scores assigned to information cards (or portions thereof) is subsequently used to determine the relevancy of the information card to the user query that produced the information card, the level of interest of the user in the information card, or other information. Such information can then be utilized to personalize the set of information cards and/or the content of the information cards that are presented to the user (or other users) in subsequent related queries.

At 970, user engagement with the content item is estimated based on the score. As indicated, in an embodiment, the estimation of the user engagement is used for subsequent queries (e.g., that are the same or similar to the current query) to select content item to present to users that submitted the queries (e.g., for subsequent queries submitted by the same user that performed the user activities from which the estimation is based, for subsequent queries submitted by users similar to that user, or for subsequent queries submitted by other users). In another embodiment, as shown in FIG. 9, the estimation of the user engagement is used to search for further content items to be presented to the user that submitted the current query. As such, as the user is interacting with a set of content items, new content items may be dynamically added to the set of content items based on the estimation of the user engagement with the current set of content items. In yet another embodiment, the estimation of the user engagement is used to dynamically remove content items from the current set of content items based on a determination that those content items would not be of interest to the user.

In some embodiments, information related to user engagement with a set of content items (e.g., as a whole) is generated based on scores associated with individual content items, scores associated with the set of content items, or other scores. As an example, with respect to FIG. 9, a set of content items may be obtained in response to receiving a query at 910 and 920. A presentation of at least one content item of the set of content items is provided to a user at 930. At 940, 950, and 960, user activities and their respective nature are determined, and a score (or scores) associated with the presented content item and/or each user activity are determined based on the nature of each user activity. In addition, user engagement with the set of content items (e.g., as a whole) is then estimated based on the score(s) associated with the presented content item (or user activities thereof) along with other scores associated with other content items or with the set of content items (or user activities thereof).

Figure 10:
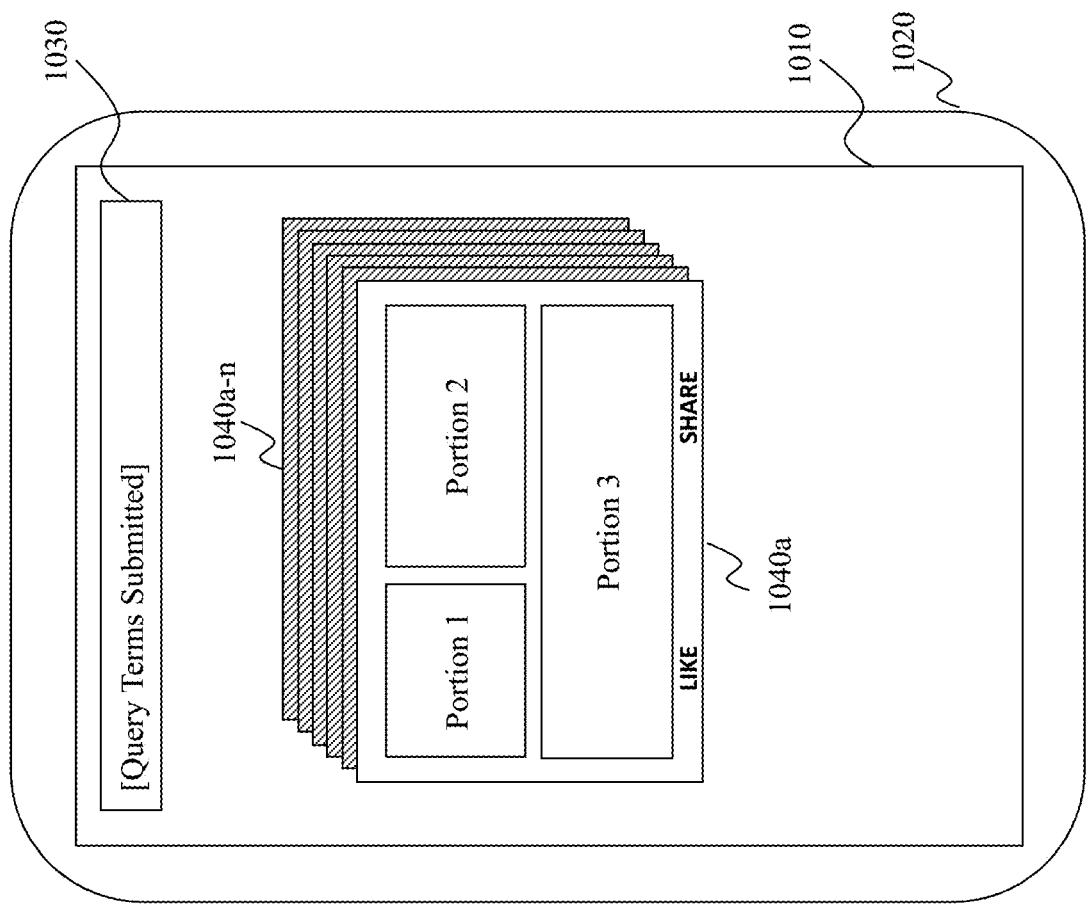
FIGS. 10-14 illustrate exemplary user activities with respect to content items, according to different embodiments of the present teaching.

FIGS. 10-14 illustrate exemplary user activities with respect to content items, according to different embodiments of the present teaching. For example, FIG. 10 illustrates a user interface 1010 on a mobile device 1020 after a user has submitted query terms in query input area 1030. In response to the submission of the query terms, a stack of information cards 1040a-1040n is presented to the user on the user interface 1010. As shown, in some embodiments, the presentation of the information cards is provided to a user without providing an intermediate set of results related to the query after the receipt of the query and before the presentation of the information cards. The presentation of the information cards is, for example, provided to the user without first presenting the user with a list of search result links and requiring the user to select (e.g., by clicking, tapping, etc.) one of the presented search result links to be provided with the presentation of the content items. As depicted, the information card 1040a is presented on top of the other information cards 1040 such that content of the information card 1040a (e.g., within portions of the information card 1040a) is in view on the user interface 1010. In some embodiments, the user can view or otherwise access the content of the other information cards by swiping away the information card 1040a, dragging the information card 1040a to another position within the stack of information cards 1040, selecting another one of the information cards 1040, etc. In some embodiments, each of the information cards 1040 may correspond to a respective domain (e.g., weather, restaurants, movies, music, navigation, calendar, etc.). Viewing or otherwise accessing the content of other information cards may thus allow a user to view or otherwise access the content of information pertaining to other domains.

Figure 11:
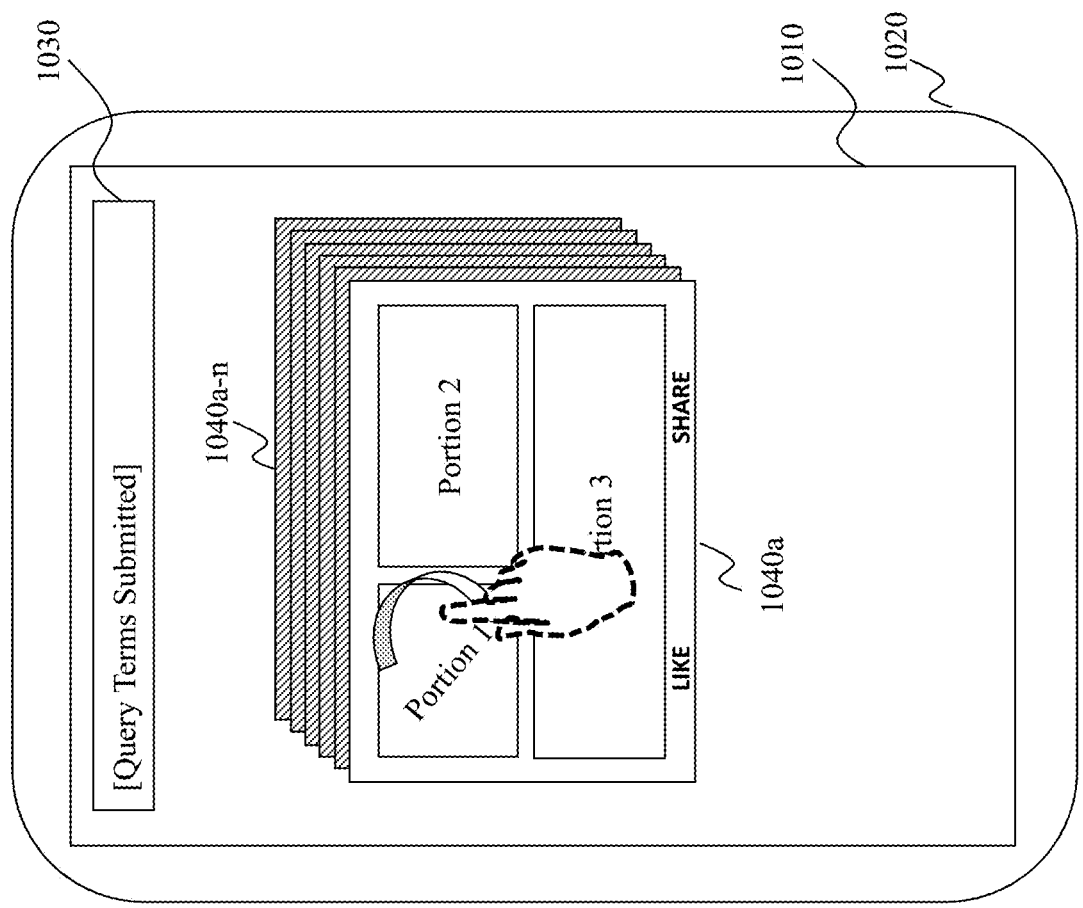

FIG. 11 illustrates a rotate action being performed with respect to content in Portion 1 of the information card 1040a. In an embodiment, the depicted rotate action is an action that triggers a modification of the information card 1040a (or the Portion 1 content) such that an instance of the information card 1040a (or the Portion 1 content) is modified and then stored for subsequent presentation of the information card 1040a. In one use case, for example, the modified version of the information card 1040a (or the rotated Portion 1 content) is presented to the user (instead of the original version of the information card 1040a) in response to a subsequent user query. In another embodiment, the depicted rotate action is an action that triggers a modification of the presentation of the information card 1040a (or the Portion 1 content) such that a subsequent presentation of the information card 1040 comprises the original version of the information card 1040a (or the non-rotated Portion 1 content).

Figure 12:
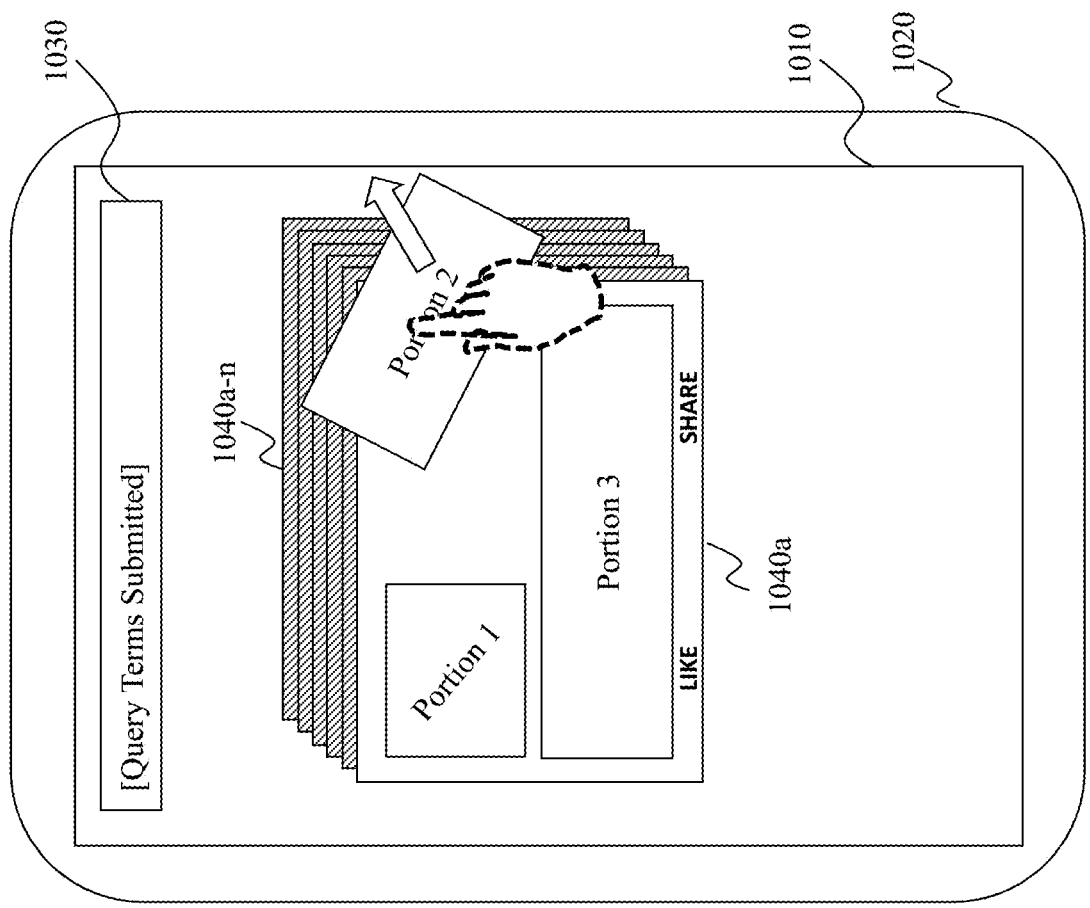

FIG. 12 illustrates a removal action being performed with respect to content in Portion 2 of the information card 1040a. In an embodiment, the depicted removal action is an action that triggers a modification of the information card 1040a (or the Portion 1 content) such that an instance of the information card 1040a (or the Portion 1 content) is modified and then stored for subsequent presentation of the information card 1040a. In one scenario, for example, the modified version of the information card 1040a (e.g., the information card 1040a without the Portion 2 content) is presented to the user (instead of the original version of the information card 1040a) in response to a subsequent user query. In another embodiment, the depicted removal action is an action that triggers a modification of the presentation of the information card 1040a (or the Portion 1 content) such that a subsequent presentation of the information card 1040 comprises the original version of the information card 1040a (e.g., the information card 1040a with the Portion 2 content).

Figure 13:
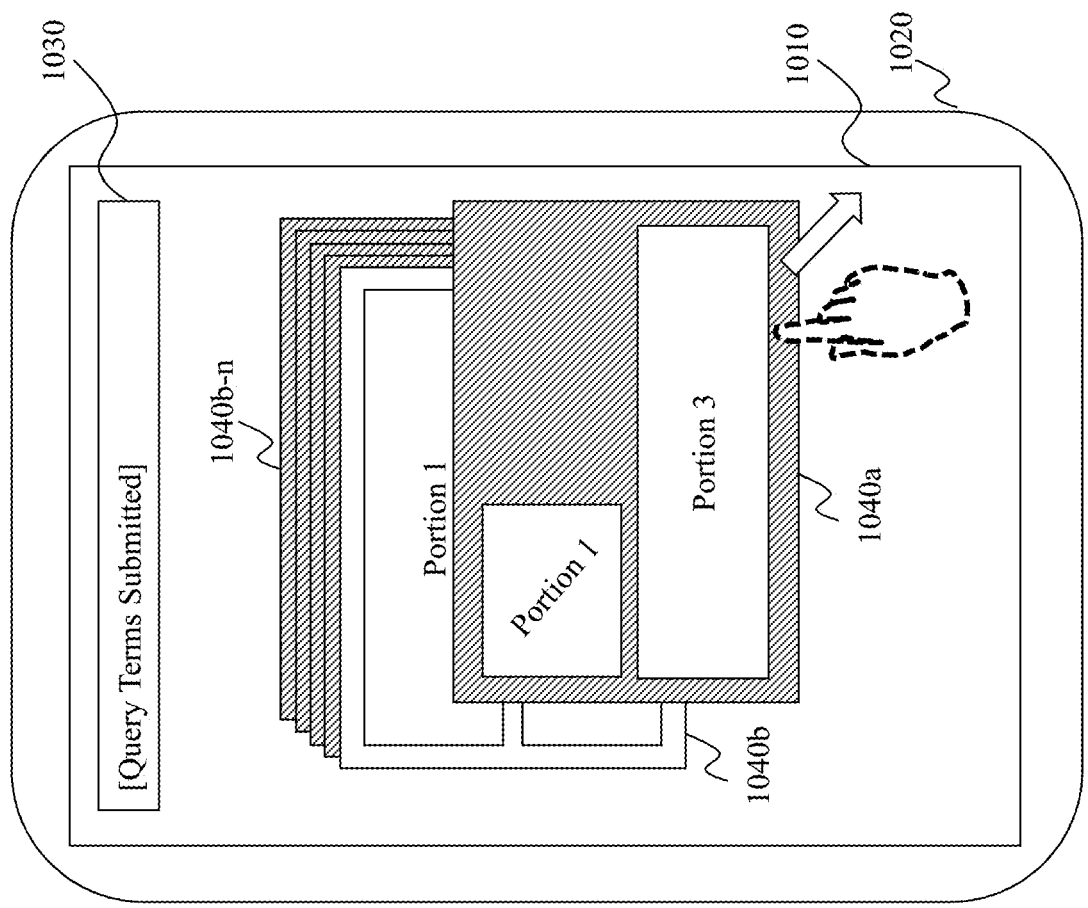

FIG. 13 illustrates a removal action being performed to remove the information card 1040a from the presentation of the stack of information cards 1040. The removal action may, for example, comprise a swipe action, a drag-and-drop action, or other action that triggers the removal of the information card 1040a from the presentation of the stack of information cards 1040. After the removal action in FIG. 13 is performed on the information card 1040, the information card 1040b is presented to the user on top of the stack of information cards 1040b-n such that the contents of the information card 1040b (e.g., within portions of the information card 1040b) is in view on the user interface 1010.

Figure 14:
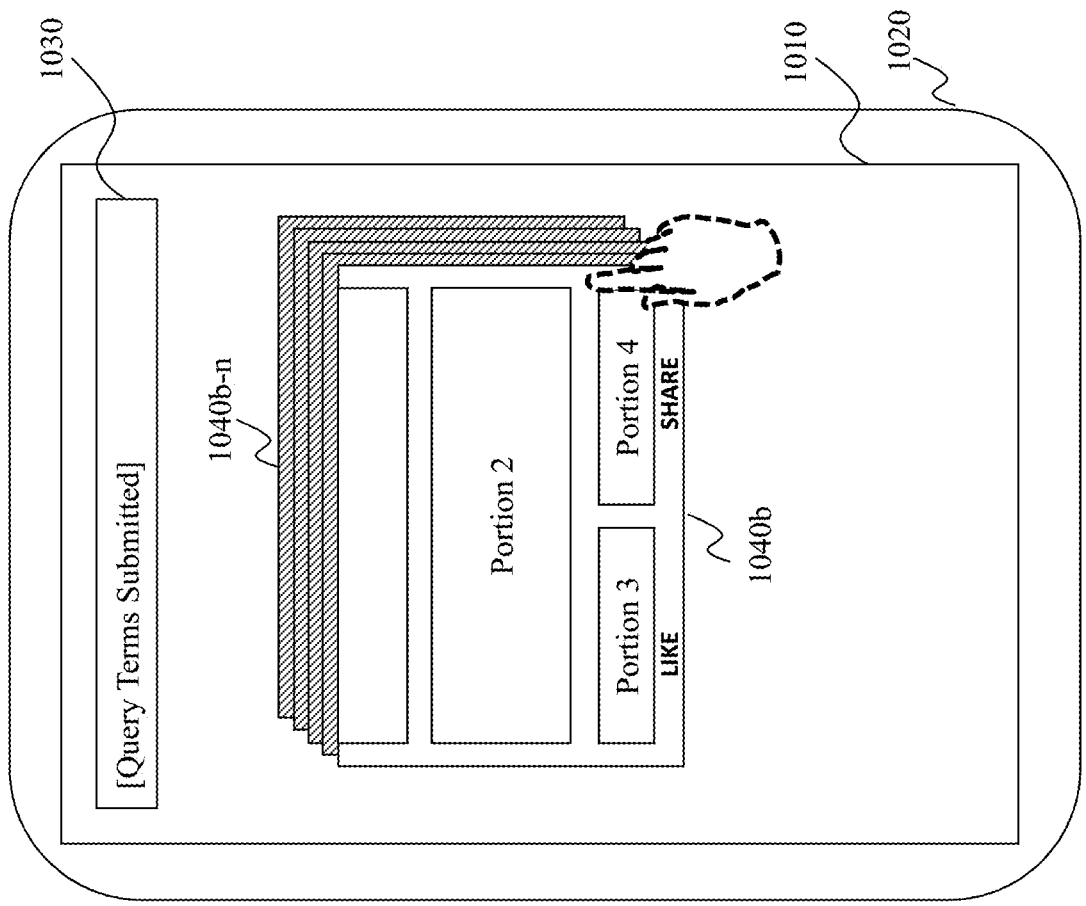

FIG. 14 illustrates a scroll action being performed with respect to the information card 1040b. As shown, the user performs the scroll action on information card 1040b such that the content of Portions 2, 3, and 4 of the information card 1040b is in view on the user interface 1010 (as opposed to the content of Portions 1 and 2 of the information card 1040b). It is understood that, although exemplary user activities are described herein (e.g., with respect to FIGS. 10-14), they are by ways of example rather than limitation. Any other appropriate user activity can be performed, monitored, detected, and/or utilized to provide information related to user engagement with content items within the scope of the present teaching. Other examples comprise moving a portion of a content item from one position of the content item to another position of the content item, adding content to the content item, etc.

In some embodiments, each of the user activities described with respect to FIGS. 10-14 are monitored so that user engagement with the information cards 1040 may be analyzed based on those user activities. In an embodiment, scores are determined for each information card 1040 based on a user's activities related to the respective information card 1040. As an example, scores are determined for each information card 1040 based on the amount of time that the user spent on the respective information card 1040 before removing the information card 1040 from view, the rate at which the user scrolls through portions of the respective information card 1040, whether the user shares the respective information card 1040 (or portions thereof) with other users, how the user rates the respective information card 1040 (e.g., likes, dislikes, numerical rating, etc.), or other parameters related to user activity.

In another embodiment, the scores associated with each of the information cards 1040 are analyzed to determine one or more scores associated with the overall set of information cards 1040. As an example, a score may be determined for the overall set of information cards 1040 with regard to how relevant the user perceives the set of information cards 1040 to be with respect to the query (e.g., the query terms shown in FIGS. 10-14). As another example, a score may be determined for the overall set of information cards 1040 with regard to the level of interest the user has with the overall set of information cards 1040.

In another embodiment, additional (or alternative) scores are determined for the overall set of information cards 1040 based on metrics, such as the total amount of time that the user spend on the overall set of information cards 1040, a number of the information cards 1040 that the user browsed during presentation of the overall set, the rate of certain user activities (or types of user activities) that occur during presentation of the overall set, the number of cards removed during presentation of the overall set, the number of cards saved by the user during presentation of the overall set (e.g., bookmarked for later viewing), the ratings given to the information cards by the user during presentation of the overall set (e.g., likes, dislikes, numerical rating, etc.), the number of information cards that are shared by the user with other users during presentation of the overall set, etc.

Figure 15:
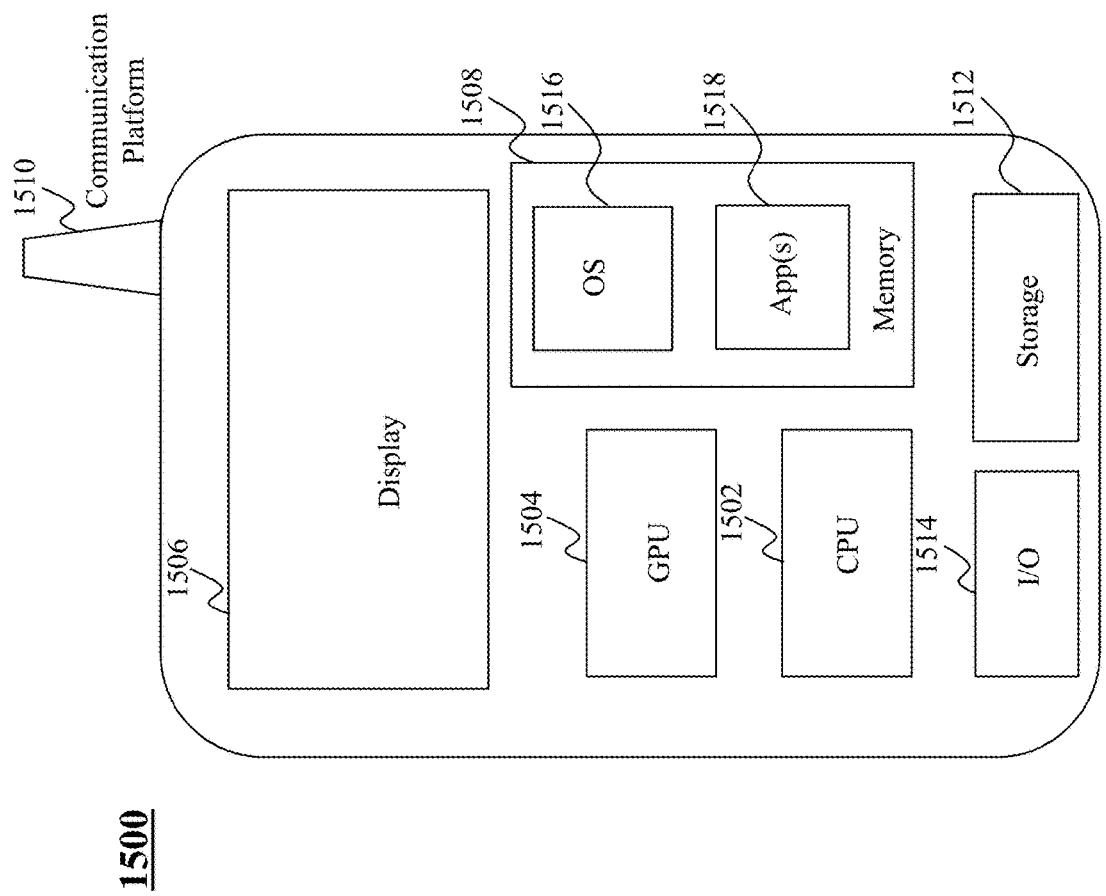
FIG. 15 depicts a general mobile device architecture on which the present teaching can be implemented.

FIG. 15 depicts a general mobile device architecture on which the present teaching can be implemented. In this example, the user device on which content item (with which user engagement is measured) is presented is a mobile device 1500, including but not limited to, a smart phone, a tablet, a music player, a handled gaming console, a global positioning system (GPS) receiver. The mobile device 1500 in this example includes one or more central processing units (CPUs) 1502, one or more graphic processing units (GPUs) 1504, a display 1506, a memory 1508, a communication platform 1510, such as a wireless communication module, storage 1512, and one or more input/output (I/O) devices 1514. Any other suitable component, such as but not limited to a system bus or a controller (not shown), may also be included in the mobile device 1500. As shown in FIG. 15, a mobile operating system 1516, e.g., iOS, Android, Windows Phone, etc., and one or more applications 1518 may be loaded into the memory 1508 from the storage 1512 in order to be executed by the CPU 1502. The applications 1518 may include a browser or any other suitable mobile apps for receiving user queries, providing a presentation of a content item related to the query, detecting user activities related to the content item, or performing other operations.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 16:
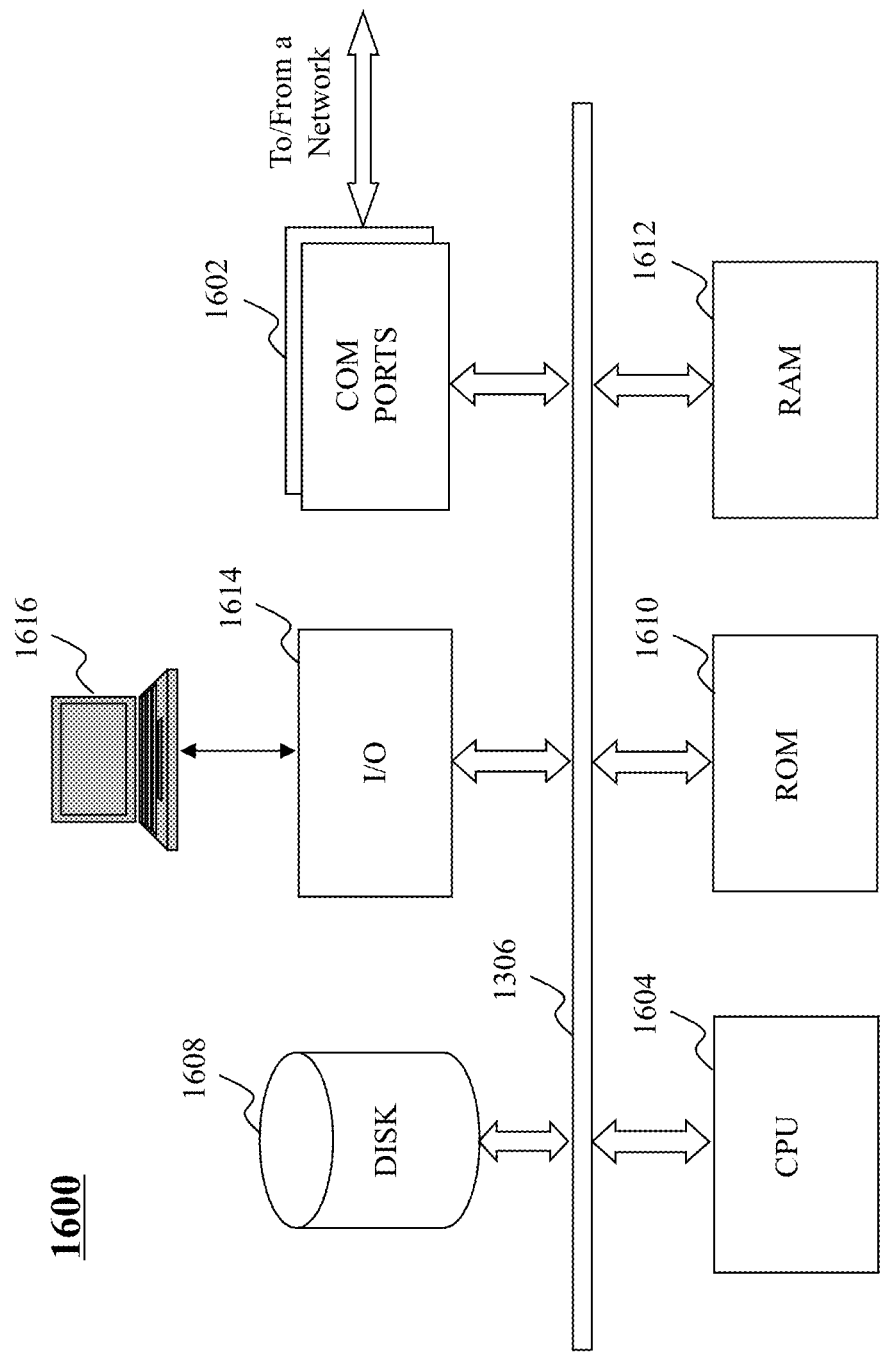
FIG. 16 depicts a general computer architecture on which the present teaching can be implemented.

FIG. 16 depicts a general computer architecture on which the present teaching can be implemented and has a functional block diagram illustration of a computer hardware platform that includes user interface elements. The computer may be a general-purpose computer or a special purpose computer. This computer 1600 can be used to implement any components of the user engagement measurement architecture as described herein. Different components of the system in the present teaching can all be implemented on one or more computers such as computer 1600, via its hardware, software program, firmware, or a combination thereof. Although only one such computer is shown, for convenience, the computer functions relating to the target metric identification may be implemented in a distributed fashion on a number of similar platforms, to distribute the processing load.

The computer 1600, for example, includes COM ports 1602 connected to and from a network connected thereto to facilitate data communications. The computer 1600 also includes a central processing unit (CPU) 1604, in the form of one or more processors, for executing program instructions. The exemplary computer platform includes an internal communication bus 1606, program storage and data storage of different forms, e.g., disk 1608, read only memory (ROM) 1610, or random access memory (RAM) 1612, for various data files to be processed and/or communicated by the computer, as well as possibly program instructions to be executed by the CPU. The computer 1600 also includes an I/O component 1614, supporting input/output flows between the computer and other components therein such as user interface elements 1616. The computer 1600 may also receive programming and data via network communications.

Hence, aspects of the method of measuring user engagement, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network, for measuring user engagement with content items, comprising:
    receiving, from a user device, a query;
    obtaining a set of content items related to the query;
    providing, on a user interface, at least one content item of the set of content items, the at least one content item being directly provided via at least one card;
    determining a user activity related to the at least one content item;
    determining an amount of time between a time at which a presentation of the at least one content item is provided and a time at which the user activity occurred, wherein the user activity is related to modifying the presentation of at least a portion of the at least one content item;
    determining a score associated with the at least one content item based on the amount of time; and
    generating information related to user engagement with the set of content items based on the score.

2. The method of claim 1, wherein the at least one content item is directly presented via the at least one card, without presenting a link associated with the at least one card.

3. The method of claim 1, wherein the user activity is related to manipulation of the at least one content item.

4. The method of claim 1, wherein the user activity is related to manipulation of metadata associated with the at least one content item.

5. The method of claim 1, wherein the user activity comprises at least one of a zoom operation, a rotation operation, a pinch operation, or a scroll operation.

6. The method of claim 1, wherein the user activity comprises at least one of a first operation that is configured to remove the portion of the at least one content item from the at least one content item or a second operation that is configured to remove the portion of the at least one content from a focus of presentation of the at least one content item via the user interface.

7. The method of claim 1, wherein the user activity comprises at least one of a first operation that is configured to remove the at least one content item from being presented via the user interface, or a second operation to replace the at least one content item with at least one other content item of the set of content items such that the at least one other content item is presented via the user interface.

8. A system for measuring user engagement with content items, comprising at least one processor programmed to execute one or more computer program instructions which, when executed, cause the at least one processor to:
    receive, from a user device, a query;
    obtain set of content items related to the query;

provide, on a user interface, at least one content item of the set of content items, the at least one content item being directly provided via at least one card;

determine a user activity related to the at least one content item;

determine an amount of time between a time at which a presentation of the at least one content item is provided and a time at which the user activity occurred, wherein the user activity is related to modifying the presentation of at least a portion of the at least one content item;

determine a score associated with the at least one content item based on the amount of time; and generate information related to user engagement with the set of content items based on the score.

9. The method of claim 1, wherein information related to user engagement is based on a number of cards browsed.

10. A system for measuring user engagement with content items, comprising at least one processor programmed to execute one or more computer program instructions which, when executed, cause the at least one processor to:

receive, from a user device, a query;

obtain set of content items related to the query;

provide, on a user interface, at least one content item of the set of content items, the at least one content item being directly provided via at least one card;

determine a user activity related to the at least one content item;

determine an amount of time between a time at which a presentation of the at least one content item is provided and a time at which the user activity occurred, wherein the user activity is related to modifying the presentation of at least a portion of the at least one content item;

determine a score associated with the at least one content item based on the amount of time; and generate information related to user engagement with the set of content items based on the first score.

11. The system of claim 10, wherein the at least one content item is directly presented via the at least one card, without presenting a link associated with the at least one card.

12. The system of claim 10, wherein the user activity comprises at least one of a zoom operation, a rotation operation, a pinch operation, or a scroll operation.

13. A machine-readable tangible and non-transitory medium having information recorded thereon for measuring user engagement with content items, wherein the information, when read by the machine, causes the machine to perform the following:

receiving, from a user device, a query;

obtaining a set of content items related to the query;

providing, on a user interface, at least one content item of the set of content items, the at least one content item being directly provided via at least one card;

determining a user activity related to the at least one content item;

determining an amount of time between a time at which a presentation of the at least one content item is provided and a time at which the user activity occurred, wherein the user activity is related to modifying the presentation of at least a portion of the at least one content item;

determining a score associated with the at least one content item based on the amount of time; and generating information related to user engagement with the set of content items based on the score.

14. The system of claim 10, wherein the user activity comprises at least one of a first operation that is configured to remove the at least one content item from being presented via the user interface or a second operation to replace the at least one content item with at least one other content item of the set of content items such that the at least one other content item is presented via the user interface.

15. The method of claim 1, further comprising:

dynamically adding at least one other content item to the set based on the first information.

16. A machine-readable tangible and non-transitory medium having information recorded thereon for measuring user engagement with content items, wherein the information, when read by the machine, causes the machine to perform the following:

receiving, from a user device, a query;

obtaining a set of content items related to the query;

providing, on a user interface, at least one content item of the set of content items, the at least one content item being directly provided via at least one card;

determining a user activity related to the at least one content item;

determining an amount of time between a time at which a presentation of the at least one content item is provided and a time at which the user activity occurred, wherein the user activity is related to modifying the presentation of at least a portion of the at least one content item;

determining a score associated with the at least one content item based on the amount of time; and generating information related to user engagement with the set of content items based on the first score.

17. The method of claim 1, wherein the user activity is further related to modifying a display location of the portion of the at least one content item.

* * * * *